United States Patent [19]

Anthon

[11] 4,443,873
[45] Apr. 17, 1984

[54] OPTICAL SYSTEM FOR OPTICAL DISC READER

[75] Inventor: Erik W. Anthon, Santa Rosa, Calif.

[73] Assignee: Optical Coating Laboratory, Inc., Santa Rosa, Calif.

[21] Appl. No.: 198,477

[22] Filed: Oct. 20, 1980

[51] Int. Cl.³ .............................................. G11B 7/00
[52] U.S. Cl. ..................................... 369/110; 350/299
[58] Field of Search ............... 369/110, 111; 250/225; 350/394, 299

[56] References Cited

U.S. PATENT DOCUMENTS

| | | | |
|---|---|---|---|
| 4,100,577 | 7/1978 | Naruse | 369/121 |
| 4,139,263 | 2/1979 | Lehureau | 369/110 |
| 4,312,570 | 1/1982 | Southwell | 350/394 |

OTHER PUBLICATIONS

*University Physics* by Sears et al., © 1955, pp. 875–878.

Primary Examiner—Alan Faber

Attorney, Agent, or Firm—Flehr, Hohbach, Test, Albritton & Herbert

[57] ABSTRACT

Reciprocal optical system for use in an optical disc reader of the type having a laser beam and being capable of receiving optical data disc having information recorded thereon and a detector for detecting the laser beam. At least one polarizing mirror is provided and at least one converting mirror for producing a 90° phase shift is provided. At least one polarizing mirror and at least one converting mirror, and the laser beam are positioned relative to the optical disc to provide from the laser beam an outgoing beam which impinges upon said at least one polarizing mirror and thereafter upon said at least one converting mirror in its travel to the optical disc and is reflected to provide a returning beam which impinges upon said at least one converting mirror and thereafter on said at least one polarizing mirror and then onto the detector. The outgoing and returning beams are orthogonally linearly polarized with respect to each other and are separated by the polarizing mirror by one beam being reflected and the other beam being transmitted by the polarizing mirror.

17 Claims, 4 Drawing Figures

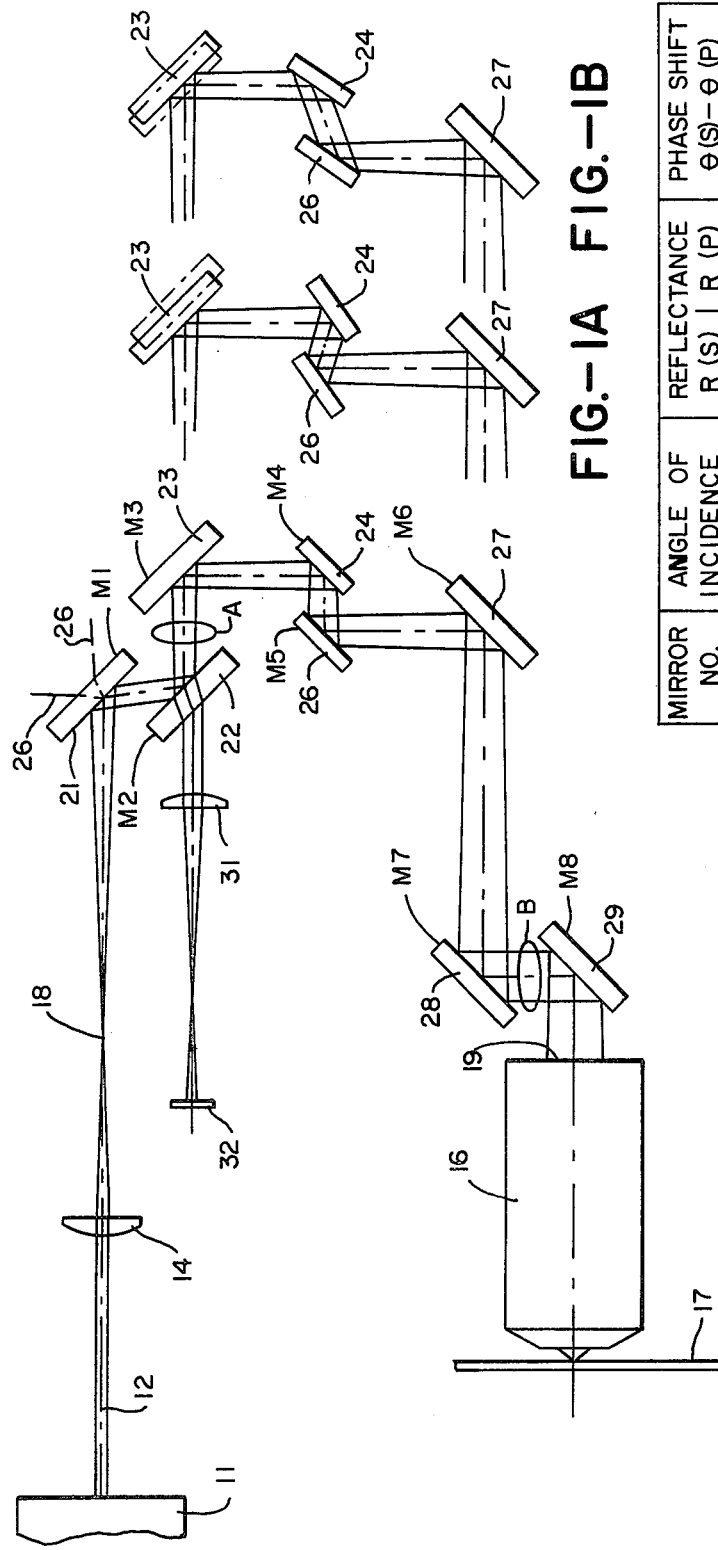

OPTICAL SYSTEM FOR OPTICAL DISC READER

This invention relates to an optical system and method for use in optical disc reading devices such as video disc players. More particularly it relates to such an optical system using polarizing and phase retarding reflectors to control the light beam.

Video disc players having optical systems have heretofore been provided. One in particular which has been available in the model VH 8000 video disc player manufactured and sold by the Magnavox Consumer Electronics Company of Ft. Wayne, Ind. Such a video disc player utilizes a video disc which is comprised of thousands of circular tracks made in a continuous spiral from the inside to the periphery of the disc. The tracks on the video disc consist of microscopic pits in the surface or holes in the coating of the disc. The length of the pits or holes and the distance between them determines the intelligence on the disc. The presence of a pit or hole in the light path will reduce the intensity of the beam reflected off the disc. The intelligence encoded in the track on the disc produces frequency and pulse width modulation of the intensity of the reflected beam corresponding to video, chroma and sound signals as the disc rotates.

The system utilizes a helium neon laser beam at 632.8 nm. The laser beam is focused to a small spot on the video disc by a short focal length lens. The light path from the laser to the lens is for compactness folded by two fixed mirrors and two articulated mirrors. The articulated mirrors are placed with their incidence planes at 90° and serve to aim the beam radially and tangentially on the track on the disc. The returning reflected beam must be well separated from the outgoing beam from the laser. Reflection back into the laser can cause noisy signals. This separation of the outgoing and the returning beam is in the model VH 8000 accomplished by the use of a polarizing (Wollaston) prism and a quarter wave retarder plate. Both the prism and the retarder plate are made from birefringent material, in this case crystal quartz.

The linear birefringence in the quartz, which manifests itself as a difference in refractive index for light polarized parallel and perpendicular to the optical axis, is used in both the prism and the retarder plate. The difference in refractive index will cause the Wollaston prism to deflect a horizontally and a vertically polarized beam at slightly different angles, thereby separating them. In the quarterwave plate the difference in refractive index will cause a 90° phase shift between two mutually perpendicularly polarized components of a beam. This can turn a linearly polarized beam into a circularly polarized beam and vice versa. The outgoing laser beam passes through the Wollaston prism which deflects the horizontally polarized component (if there is any) out of the beam path while it passes the vertically polarized component of the beam to the focusing lens and to the surface of the video disc. The beam passes through the quarterwave plate which is placed adjacent to the Wollaston prism. The quarterwave plate converts the vertical linearly polarized beam into a circularly polarized beam.

The beam reflects off the video disc surface and follows the identical path back to the Wollaston prism. The returning beam is also circularly polarized, but it has been reversed from right hand circular to left hand circular (or vice versa) by the reflection off the video disc. The returning circularly polarized beam is reconverted to linear polarization by passing back thru the quarterwave plate with its 90 phaseshift between the "S" and "P" component. The resultant linearly polarized beam will, because of the reversal of the circularly polarized beam, be horizontally polarized rather than vertically polarized as the outgoing beam.

The Wollaston prism will deflect the horizontally polarized beam in the opposite direction of the deflection of the vertically polarized beam. This will cause the path of the returning beam to separate from the outgoing beam (by about 2.5°).

The returning beam goes to the detector which senses the intensity modulation of the beam caused by the pits or holes in the video disc. The returning beam is effectively prevented from returning to the laser where it can cause problems by feedback or re-reflection.

In the manufacture of the video disc player heretofore described, it has been found that the optical system utilized therein is difficult to manufacture to the required accuracy. The maximum allowable wavefront distortion thru the system must be in the order of 0.1 wave to achieve the needed resolution at the video disc. The crystal quartz optical parts are difficult to produce to close enough tolerances.

The Wollaston prism is especially troublesome with respect to wavefront distortion because the great path length through the quartz prism makes it very sensitive to index variations in the material.

Crystal quartz of suitable quality is also quite costly. There is, therefore, a need for a new and improved optical system and method for use in video disc players.

In general, it is the object of the present invention to provide an optical system and method for video disc players in which the polarizing prism has been replaced by at least one polarizing mirror.

Another object of the invention is to provide a system of the above character where the phase shifting function of the quarterwave plate has been replaced by phase shifts obtained in the reflection off one or more specially coated mirrors.

Another object of the invention is to provide a system of the above character which can be readily and inexpensively manufactured.

Additional objects and features of the invention will appear from the following description in which the preferred embodiments are set forth in detail in conjunction with the accompanying drawings.

FIG. 1 is a schematic diagram of an optical system incorporating the present invention for use on a video disc player. The diagram is flattened by a 45° twist at A and a 90° twist at B.

FIG. 1A is a partial schematic showing the incidence angle at the intermediate mirror decreased from 45° to 35° with no change in path length.

FIG. 1B is a partial schematic like FIG. 1A but with the incidence angle increased from 45° to 55°.

FIG. 2 is a table of reflectance and phase shift values for the mirrors used in the system shown in FIG. 1.

As shown in FIG. 1, the system of the present invention consists of a laser 11 of a conventional type such as a helium neon laser having a wavelength of 632.8 nm to provide a red light laser beam 12. The beam encounters the lens 14 which focusses the laser beam to a small spot 18 from where it gradually diverges to sufficient size to fill the entrance aperture of the objective lens 16.

The beam impinges upon a plurality of mirrors between the spot 18 and the objective lens 16. The mirrors are identified as M1, M2, M3, M4, M5, M6, M7, M8. They are also identified in FIG. 1 as 21, 22, 23, 24, 25, 26, 27 and 28, respectively. All the mirrors serve to fold the system for compactness. The particular function of each of the mirrors is hereinafter described.

Mirrors M1 and M2 or 21 and 22 in FIG. 1, serve to linearly polarize the beam and to separate the returning beam from the outgoing beam. The preferred incidence angle for M1 and M2 is 56° which is Brewsters angle for glass, but it might be any angle between 45° and 60°. These mirrors are coated in a conventional manner to preferentially reflect the S polarized component and preferentially transmit the P polarized component of the beam. Most of the S polarized component which is not reflected will be transmitted and most of the P polarized component which is not transmitted will be reflected. There will be only a small loss.

The table in FIG. 2 shows that a very modest ratio of about 10:1 between the S and the P polarized reflectance can readily be provided by a single mirror. The use of two mirrors in series raises the effective ratio to 100:1 which is very adequate. It should be noted that mirrors can be coated that have a much higher ratio between the S and P polarized reflectance. The use of a single polarizing mirror rather than two polarizing mirrors in series can be considered if the ratio from a single mirror can be brought to a high enough value. The assumption of a 10:1 ratio for a single mirror is conservative.

The returning beam impinges upon and is transmitted through one polarizing mirror M2. This does not guarantee a high degree of linear polarization of the detected beam, but this is of no consequence. The returning beam is effectively prevented from reaching the laser since two P polarized reflectances are required.

The mirrors M3, M4, M5 and M6 or 23, 24, 25 and 26 in FIGS. 1, 1A and 1B are designed to provide the 90° phase shift provided by the quarter wave plate in the previously described system. Each of the four mirrors is designed to provide a phase shift of 22.5° at the preferred incidence angle of 45°. A special coating described below is used which gives high values for reflection of both S and P polarization but retards the P polarized component by 22.5° relative to the S polarized component.

The phase shift produced by a given coating is angle sensitive. The phase shift generally will tend to increase with increasing incidence angle. The coating applied to the mirrors M3, M4, M5 and M6 is designed to produce exactly 22.5° phase shift at 45° incidence. The phase shift obtained from coated mirrors in actual production may differ slightly from this value. The mirrors M4 and M5 are therefore arranged such that the incidence angle of the beam can be varied from 35° to 55° without changing the overall path length through the system as shown in FIGS. 1A and 1B.

The resulting change in phase shift in mirrors M4 and M5 can be used for fine adjustment of the total phase shift to be the desired 90°. This includes any residual phase shift from mirrors M7 and M8.

The position of the mirrors M1 and M2 relative to mirror M3 to M6 is twisted 45° at A from the position shown in the flat diagram in FIG. 1. This makes the linearly polarized beam reflected from mirror M2 resolve into equal P and S-components as it reaches mirror M3. The total of 90° phase shift in the four mirrors will convert the linearly polarized beam that arrives at mirror M3 into a fully circularly polarized beam as it leaves mirror M6. Conversely a circularly polarized beam reaching mirror M6 will be converted into a linearly polarized beam as it leaves mirror M3.

The mirrors M7 and M8 are articulated mirrors. They are placed with their incidence planes rotated by 90° with respect to each other (a 90° twist at B).

Mirror M7 serves to aim the beam tangentially and the mirror M8 radially on the video disc just as in the previously described system. The mirrors M7 and M8 are not intended to produce any phaseshift effect. Any phase shift effect that the coatings on these mirrors might have will cancel if it is the same on both mirrors because of the 90° angle between their incidence planes. Some small residual phase-shift could result from mirrors M7 and M8.

The coating on mirrors M3, M4, M5, M6, M7 and M8 is designed to have high reflectivity for both S and P polarized light. The values shown in the table FIG. 2 $R(S)=0.95$ and $R(P)=0.90$ can be considered conservative minimal values. Reflectivities closer to 1.0 can be obtained by good coatings, but $R(P)$ will generally tend to be a little smaller than $R(S)$. This causes a slight polarization effect in the mirrors. Equal polarization in mirrors M7 and M8 will cancel, but polarization in mirrors M3, M4, M5 and M6 is cumulative. The polarization effect will result in slightly elliptical polarization rather than true circular polarization as required when the mirrors are adjusted for exactly 90° phase shift. It is possible to compensate for the polarization effect by a slight increase in the twist angle at A. Increasing the twist angle from 45° to 48° will favor the P polarization over the S polarization at mirror M3 enough to compensate for the polarization effects resulting from mirror reflectivity of $R(S)=0.95$ and $R(P)=0.90$.

The polarization in the mirrors is expected to be completely predictable and a variable adjustment of the twist angle at A often may not be needed.

By way of example with respect to the mirrors M1–M8 a polarizing coating of high reflectivity for the S polarized component and for high transmission for the P polarized component of a beam at the 632.8 nanometers wavelength at an angle of incidence of 55° could have the following design:

substrate $(LH)^9$ air where H and L are quarterwave equivalent thicknesses of high and low index materials at a design wavelength of approximately 550 nanometer design wavelength. A suitable high index material would be titanium dioxide ($TiO_2$) having an index of refraction of 2.35 and the low index material would be silicon dioxide ($SiO_2$) having an index of refraction of 1.45. This type of coating could be utilized for the mirrors M1 and M2.

A phase shifting high reflecting coating which at 45° incidence retards the P polarized component of a beam of 632.8 nanometers by 22.5° relative to the S polarized component would have the following design:

$(HHL)^{10}$ where H and L are quarterwave equivalent thicknesses of high and low index materials at a design wavelength of approximately 425 nanometers. The layers of high index material can be formed of titanium dioxide ($TiO_2$) having an index of refraction of approximately 2.35 and the layers of low index material can be formed of silicon dioxide ($SiO_2$) having an index of refraction of approximately 1.45. These phase shifting high reflective coatings can be utilized on the mirrors M3, M4, M5 and M6. The mirrors M7 and M8 can be provided with conventional high reflection coatings which do not provide a phase shift.

The light beam which travels from the objective lens 16 is focussed to a very small spot on the surface of the video disc. The intensity of the beam reflected off the video disc surface depends on the presence or absence of a hole or pit at the illuminated spot. The reflected beam intensity will be modulated by the signals encoded in the track as the track moves past the illuminated spot.

The beam that is incident on and is reflected off the video disc is circularly polarized. The reflection off the video disc reverses the direction of circular polarization from right hand to left hand (or vice versa). It should be noted that reflection off every mirror in the system reverses the circular polarization component in the beam but the beam strikes all mirrors except the video disc twice, once on the way out and once returning. The double reversals cancel and only the video disc effectively reverses the direction of circular polarization.

The reflected beam follows a return path exactly opposite to that of the incident beam back to mirror M2 and thus there is provided a reciprocal system. The 90° phase shift in the mirrors M6, M5, M4 and M3 will reconvert the circularly polarized beam into a linearly polarized beam but the orientation of the resulting linear polarization will be perpendicular or orthogonal to the original orientation of polarization as a result of the reversal of the direction of circular polarization at the video disc.

The beam leaves mirror M2 as linearly S polarized and returns as linearly P polarized. This P polarized beam is readily transmitted through mirror M2 through lens 31 to the detector 32. Only a small part of the returning P polarized beam is reflected by mirror M2 to mirror M1 and even less is reflected by mirror M1 back to the laser.

It is apparent from the foregoing that there has been provided an optical system and method which eliminates the need for crystal optics elements such as the polarizing (Wollaston) prism and the retarding quarter wave plate by replacing them with one or more mirrors. Mirrors with the proper coatings for polarization and for phase shifting and with flatness to provide a better than 0.1 wave wavefront transmission accuracy can readily and inexpensively be manufactured in large quantities. The new system will fit into the same space as the system using the crystal optics elements.

What is claimed:

1. In a reciprocal optical system for use in an optical disc reader of the type having a laser generating a laser beam and a detector for detecting the laser beam, means receiving the laser beam for forming an outgoing beam which travels to the video disc and is reflected thereby to provide a return beam to the detector, said means including at least one polarizing mirror which is impinged by both the outgoing and returning beams; said outgoing and returning beams being characterized by being orthogonally linearly polarized whereby said at least one polarizing mirror serves to separate the returning beam from the outgoing beam, said means including converting means upon which the outgoing beam and the returning beams impinge, said converting means introducing a 90° phase shift in the beams whereby the outgoing beam is converted from a linearly polarized beam to a circularly polarized beam and the returning beam is converted from a circularly polarized beam to a linearly polarized beam, said converting means including at least two mirrors in series providing a combined phase shift of 90°.

2. A system as in claim 1 wherein said at least one polarizing mirror includes first and second polarizing mirrors and in which at least one of the first and second polarizing mirrors is utilized for separating the outgoing beam from the returning beam by reflecting one of the beams and transmitting the other of the beams.

3. A system as in claim 1 wherein the phase shift provided by said at least two mirrors can be varied by changing the angle incidence of the beam on at least one of the mirrors.

4. A system as in claim 1 wherein each of said mirrors is provided with a coating comprised of alternate layers of materials having high and low indices of refraction.

5. In a reciprocal optical system for use in an optical disc reader of the type having a laser beam, means for receiving an optical data disc having information recorded thereon and a detector for detecting the laser beam, at least one polarizing mirror, at least two converting mirrors for producing a combined 90° phase shift, each of said mirrors producing a phase shift substantially less than 90°, means for positioning said at least one polarizing mirror and said at least one converting mirror, and means for directing the laser beam to provide an outgoing beam which impinges upon said at least one polarizing mirror and thereafter upon said at least two converting mirrors in its travel to the optical disc which reflects the outgoing beam to provide a returning beam that impinges upon said at least two converting mirrors, thereafter on said at least one polarizing mirror and thence onto the detector.

6. A system as in claim 5 wherein said outgoing and returning beams are orthogonally linearly polarized with respect to each other whereby one of the outgoing and returning beams will be reflected by the polarizing mirror and the other of the outgoing and returning beams will be transmitted by the polarizing mirror.

7. A system as in claim 5 wherein said converting mirror causes the outgoing beam to be converted from a linearly polarized beam to a circularly polarized beam and the returning circularly polarized beam to be converted to a linearly polarized beam.

8. A system as in claim 5 wherein said optical disc causes a reversal in direction of rotation with respect to the circular polarization of the outgoing beam with respect to the circular polarization of the returning beam.

9. A system as in claim 5 wherein the combined phase shift provided by said plurality of converting mirrors can be varied by changing the angle of incidence of the outgoing and returning beams onto at least one of the mirrors without changing the beam path lengths.

10. In an optical disc reader, a laser for generating a laser beam, a detector for detecting the laser beam, means for receiving an optical disc and for rotating the same, said optical disc having information recorded thereon, at least one polarizing mirror, at least two converting mirrors for producing a combined 90° phase shift, means for positioning said at least one polarizing mirror and said at least one converting mirror, and means for directing the laser beam to provide an outgoing beam which impinges upon said at least two converting mirrors and then travels to the optical disc and is reflected therefrom as a returning beam which impinges upon said at least two converting mirrors and thence impinges upon said at least one polarizing mirror to said detector.

11. A system as in claim 10 wherein said at least one polarizing mirror serves to separate said returning beam from said outgoing beam.

12. A system as in claim 11 wherein said at least one polarizing mirror comprises two polarizing mirrors.

13. A system as in claim 10 together with means for changing, the position of at least one of said converting mirrors so as to change the angle of incidence of the outgoing and returning beams on said at least one of said converting mirrors.

14. A reciprocal optical system for use in an optical disc reader having a laser providing an outgoing beam, means for receiving an optical disc, a detector and means for directing the outgoing beam onto an optical disc carried by the means for receiving an optical disc so that the outgoing beam is reflected thereby in the form of a returning beam into the detector, said system comprising means for separating said returning beam from said outgoing beam including a linear polarizing device and a quarterwave phase retarding device, said linear polarizing device consisting of at least one polarizing mirror operating near the Brewster angle, said quarter wave phase retarding device consisting of four phase retarding mirrors operating at approximately 45 degrees of incidence and each providing approximately 22.5 degrees of phase retardance.

15. A system as in claim 14 wherein said polarizing mirrors have a coating characterized by $$(LH)^n$$

where H and L are quarter wave equivalent thicknesses of layers of high and low index coating materials.

16. A system as in claim 14 wherein said phase retarding mirrors have a coating characterized by $$(HHL)^n$$

where H and L are quarter wave equivalent thicknesses of layers of high and low index coating materials.

17. A system as in claim 14 wherein said means for directing includes means for varying the incidence angle of at least two of said phase retarding mirrors to adjust the phase retardance of said mirrors whereby the sum of the phase retardance in the phase retarding mirrors adds up to an exact 90 degree quarter wave.

* * * * *